United States Patent
Lozano

(10) Patent No.: US 11,054,931 B2
(45) Date of Patent: Jul. 6, 2021

(54) HAPTIC AUGMENTED REALITY DEVICE FOR FACILITATING ACTIONS ON A FLYING BOOM

(71) Applicant: Defensya Ingenieria Internacional, S.L., Madrid (ES)

(72) Inventor: Alberto Adarve Lozano, Madrid (ES)

(73) Assignee: Defensya Ingenieria Internacional, S.L., Madrid (ES)

( * ) Notice: Subject to any disclaimer, the term of this patent is extended or adjusted under 35 U.S.C. 154(b) by 734 days.

(21) Appl. No.: 15/766,347

(22) PCT Filed: Oct. 4, 2016

(86) PCT No.: PCT/ES2016/070701
§ 371 (c)(1),
(2) Date: Apr. 5, 2018

(87) PCT Pub. No.: WO2017/051056
PCT Pub. Date: Mar. 30, 2017

(65) Prior Publication Data
US 2018/0290308 A1    Oct. 11, 2018

(30) Foreign Application Priority Data

Oct. 5, 2015   (ES) ................................ ES201531426

(51) Int. Cl.
| | |
|---|---|
| *G06F 3/041* | (2006.01) |
| *G06T 19/00* | (2011.01) |
| *B64D 39/00* | (2006.01) |
| *B25J 13/02* | (2006.01) |
| *G06F 3/01* | (2006.01) |

(Continued)

(52) U.S. Cl.
CPC ............ *G06F 3/0416* (2013.01); *B25J 13/02* (2013.01); *B25J 13/025* (2013.01); *B64C 13/042* (2018.01); *B64D 39/00* (2013.01); *B64D 39/06* (2013.01); *G06F 3/01* (2013.01); *G06F 3/016* (2013.01); *G06T 19/00* (2013.01); *G06T 19/003* (2013.01)

(58) Field of Classification Search
None
See application file for complete search history.

(56) References Cited

U.S. PATENT DOCUMENTS

2008/0142642 A1   6/2008   Marino et al.
2008/0169375 A1*  7/2008   Ishikawa ................. F02K 9/78
                                                              244/12.1

(Continued)

FOREIGN PATENT DOCUMENTS

EP            2280359 A1    2/2011

*Primary Examiner* — Toan H Vu
(74) *Attorney, Agent, or Firm* — William H. Honaker; Dickinson Wright PLLC

(57) ABSTRACT

Haptic augmented reality device for facilitating the actions to control a boom in full flight, allowing the boom to be controlled with a single hand, without the need for any training in what the manoeuvres refer to. In addition, the system not only provides information concerning how the operation is being performed, but also provides assistance, indicating to the boomer when a particular movement is completely prohibited (making the movement impossible) or is not recommendable (making it necessary to apply more force to perform the movement).

5 Claims, 2 Drawing Sheets

(51) Int. Cl.
*B64C 13/04* (2006.01)
*B64D 39/06* (2006.01)

(56) References Cited

U.S. PATENT DOCUMENTS

| | | | |
|---|---|---|---|
| 2008/0302916 A1 | 12/2008 | Speer | |
| 2009/0125166 A1* | 5/2009 | Johnson | B64C 13/503 |
| | | | 701/3 |
| 2010/0200705 A1 | 8/2010 | Perez | |
| 2014/0042274 A1* | 2/2014 | Hatcher | B64D 39/00 |
| | | | 244/135 A |
| 2014/0158829 A1* | 6/2014 | Gimenez Abad | B64D 39/00 |
| | | | 244/135 A |
| 2014/0214206 A1 | 7/2014 | Steinberg et al. | |
| 2014/0326825 A1* | 11/2014 | Grohmann | B64C 13/505 |
| | | | 244/17.13 |
| 2014/0346279 A1* | 11/2014 | Foo | B64D 39/02 |
| | | | 244/135 A |
| 2015/0249498 A1* | 9/2015 | Minguez Rascon | B64D 39/00 |
| | | | 244/135 A |
| 2016/0258750 A1* | 9/2016 | Golob | G01C 9/005 |

* cited by examiner

HAPTIC AUGMENTED REALITY DEVICE FOR FACILITATING ACTIONS ON A FLYING BOOM

CROSS-REFERENCE TO RELATED APPLICATION

The present invention claims priority to PCT International Patent Application Serial No. PCT/ES2016/070701 filed Oct. 4, 2016 entitled "Haptic Augmented Reality Device for Facilitating Actions on a Flying Room," which claims the benefit of ES Patent Application Serial No. P201531426 filed Oct. 5, 2015, the entire disclosures of the applications being considered part of the disclosure of this application and hereby incorporated by reference.

OBJECT OF THE INVENTION

An object of the present invention, as established in the title of the invention, is a haptic augmented reality device for facilitating the actions on a flying boom from a flight refueler or tanker aircraft to an aircraft to refuel.

An object of the invention is also a device for the control of the haptic augmented reality device.

Another object of the invention is the system wherein the control device of the haptic augmented reality device is integrated.

When in-flight refueling tasks are performed from a flight refueler to a recipient plane a boom is used which emerges from the flight refueler and is provided at its end with what is known in the sector as a "boom", whilst the specialists in charge of handling the boom are known as "boomers" or boom operators, using joysticks for this.

The haptic augmented reality device, and the control device it is integrated in, is characterized in that it allows performing the actions to control the boom with a single hand, without the need for any training in what the manoeuvres refer to. The system also provides information and assistance concerning how the operation is being performed, indicating to the operator if an operation is recommendable or not.

Therefore, the present invention is included within the scope of haptic control systems on the one hand, and operation control systems of in-flight refueling on the other.

BACKGROUND OF THE INVENTION

At present, when in-flight refueling tasks are performed with a boom, the specialists in charge of handling them are known as "boomers" or operators, using joysticks to control that refueling element.

Said control elements allow the vertical or horizontal movement of said boom similarly to that used in video games to fly in a plane or drive a car. Likewise, the extraction and retraction of the boom or extending part of the boom, is performed with another joystick that is usually handled with the left hand. Although these devices used are fairly intuitive, prior training is required so that the operator associates his/her movements with those of the boom to control. As has been indicated, both hands are necessary to handle the refueling boom and they do not usually give the user any type of feedback concerning how the operation is being performed, nor regarding the actions that are or are not permitted.

The joysticks of the state of the art used for handling the booms are complex to handle, and both hands must be used, in addition to requiring prior training, lacking any means of indicating whether the movement to be performed is permitted or not.

Therefore, an object of the present invention is to develop a device that facilitates the control and handling of the booms used in in-flight refueling, which can be used with a single hand and which has means of indicating whether the movements intended to be performed are permitted or not, developing a device such as that described below, and which is essentially set down in claim 1.

DESCRIPTION OF THE INVENTION

The object of the present invention is a haptic augmented reality device for facilitating the actions to control a boom in full flight, allowing the boom to be controlled with a single hand, without the need for any training in what the manoeuvres refer to. In addition, the system not only provides information concerning how the operation is being performed, but also provides assistance, indicating to the boomer when a particular movement is completely prohibited (making the movement impossible) or is not recommendable (making it necessary to apply more force to perform the movement).

Thanks to the device it allows completely or partially automating the in-flight refueling process. This device and the associated control mechanism radically improve the current situation, allowing the user to handle the boom with a single hand.

An object of the present invention is also the control device wherein the augmented reality device is integrated, which allows facilitating the actions on a boom.

The haptic device and the control device are integrated in a system which helps control and refueling in flight.

The haptic device comprises:
  a first double set of motors, which allow a horizontal movement similarly to an actual boom
  a second double set of motors, which allow a pitch movement, and which rotate with respect to an axis orthogonal to the axis of rotation of the first set of motors.
  a counterweight to balance the forces
  a vibrator which, in accordance with the type and frequency thereof, can indicate to the user the existence of a drawback or not at the time of performing the intended movement.

A position sensor or decoder has been included in all the motors with the aim of suitably determining the motor position with respect to its axis of rotation.

The system wherein the haptic control device is integrated also comprises:
  Information subsystem comprising:
    Database with 3D models of all the elements necessary in a refueling operation (booms, planes, etc.).
    Expert system including information on the operation (forbidden movements, recommendations, etc.).
  Perception subsystem comprising:
    Image capturing means. Redundant system in charge of the visual capture of information relating to the operation. The system is prepared to combine several types of visual information.
      Image capturing with structured lighting: a sequence of images captured with a set of cameras at a predetermined rate of frames per second.
      Image capturing with cameras with time of flight (ToF) sensors.

Information from cameras from the standard instrumentation of reloading aircraft. The system allows the connection of the cameras found as standard in these aircrafts, suitable for the initial phase of the reloading operation, when the aircraft to be refueled is more than 15 metres away. This information shall be used to provide additional redundancy to the system.

Contextual information system. Sensor system which captures information from the environment of interest for the operation (GPS position of recipient aircraft, GPS position of reloading aircraft, relative boom-humidity receptacle distance, temperature, wind, movement sensors of the actual boom, etc).

Analysis subsystem. It is the fundamental part of the invention and allows creating a 3D model of the operation stage in real time (maximum 2 frames' delay), from analysis of the data provided by the perception system. In particular, using image analysis method with structured lighting on a combination of images captured and the information of the location of the recipient plane, it makes it possible to perform a virtual positioning of a 3D model of the recipient in the surroundings of the boom.

Smart refueling system. From the result of the analysis performed by the previous subsystem, and using the information of the expert system in refueling operations, this system determines and updates in real time:

The recommended sequence of movements to be executed to successfully perform the information.

The set of movements to prevent (broken down into actions).

The set of movements to hinder, and to what degree (broken down into actions).

Haptic remote control subsystem as previously described.

Feedback subsystem. Its mission is to produce in the haptic remote control subsystem actions that reflect both the effect of the environment (e.g. the wind force on the system), and the regulatory and recommended strategies for performing the operation (expert refueling operation system). For this reason, we distinguish 2 parts:

Boom-Haptic subsystem feedback. A set of sensors in the actual boom captures the forces that the actual boom is subjected to and turns these forces into actions on the control motors of the haptic subsystem.

Smart refueling system-Haptic subsystem feedback. The smart refueling system determines in real time the set of movements to favour and hinder and to what degree and translate the set into a series of actions on the control motors of the haptic subsystem.

Unless indicated otherwise, all the technical and scientific elements used in the present specification have the meaning typically understood by the normal person skilled in the art to which this invention belongs. In the practice of the present invention, it is possible to use processes or materials which are similar or equivalent to those described in the specification.

Throughout the description and the claims the word "comprises" and its variants are not intended to exclude other technical characteristics, additives, components or steps. For persons skilled in the art, other objects, advantages and characteristics of the invention will be inferred in part from the description and in part from the practice of the invention.

EXPLANATION OF THE FIGURES

To complement the description being made and in order to aid towards a better understanding of the characteristics of the invention, in accordance with a preferred example of practical embodiment thereof, a set of drawings is attached as an integral part of said description wherein, with illustrative and non-limiting character, the following has been represented.

PREFERRED EMBODIMENT OF THE INVENTION

A preferred embodiment of the invention proposed is described below in light of the figures.

Figure 1:
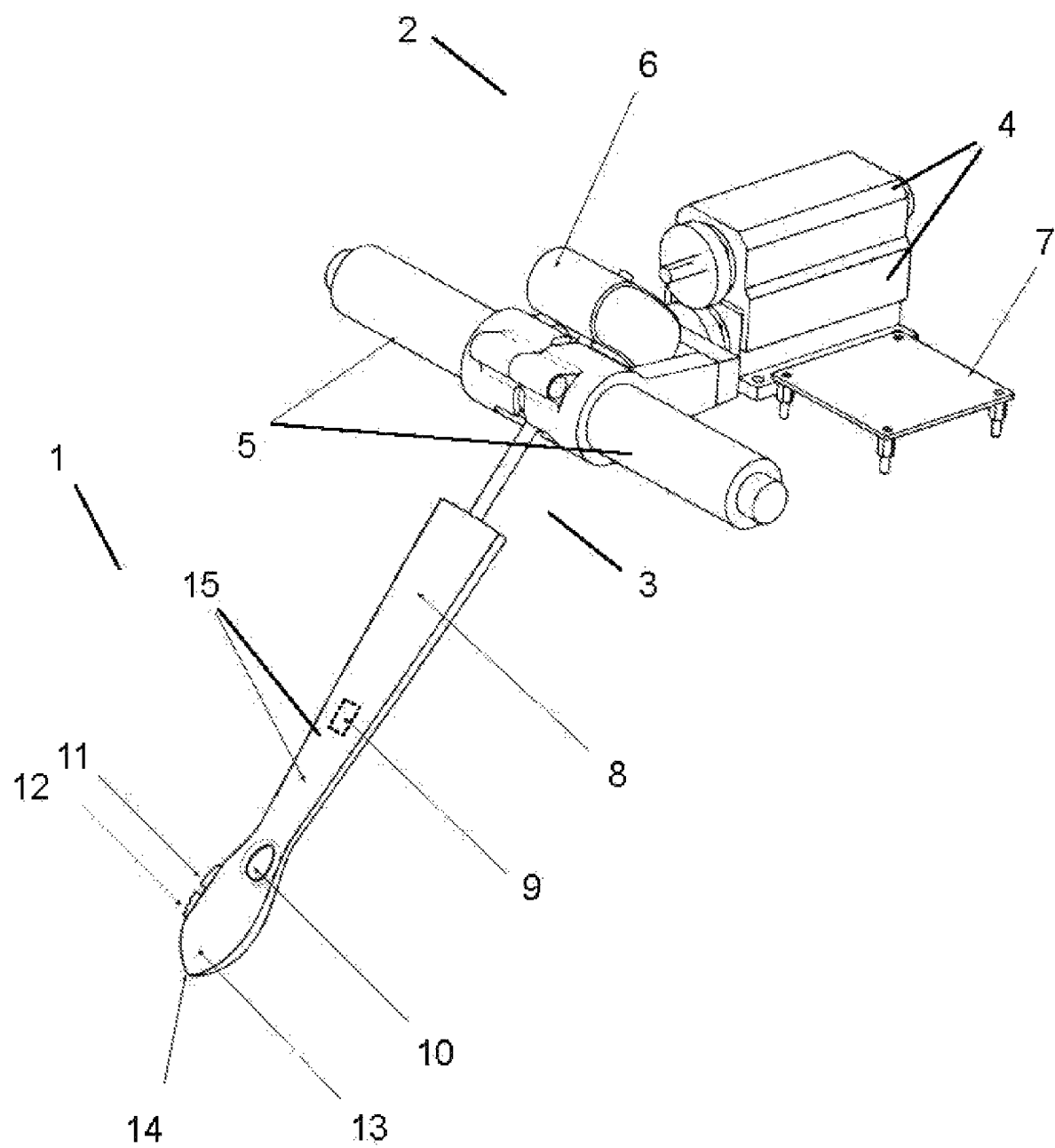
In FIG. 1, we can observe a representation of the haptic augmented reality device object of the application.

In FIG. 1, we can observe that the haptic device comprises:
a boom model or prototype (1)
control and actuation means (2), wherefrom a transmission arm (3) emerges for actuation of the boom model (1).

Where the control and actuation means (2) comprises:
a first double set of motors (4), which allow executing a horizontal movement of the boom model (1).
A second double set of motors (5), which allow a pitch movement, and which rotate with respect to an axis orthogonal to the axis of rotation of the first set of motors.
A counterweight to balance the forces of both sets of motors.
First electronic means (7) for actuation and control of the motors (4) and (5).

The boom model (2) has a form similar to the actual boom that is intended to be handled and which comprises:
second electronic means (8), which controls the elements that form part of the boom model
a vibrator (9) housed inside the boom model (8)
a first button (10), a second button (11) and a third button (12),
an acceleration sensor (13), and
a magnet (14).
LEDs (15).

All of these allowing control over the boom with a single hand.

Figure 2:
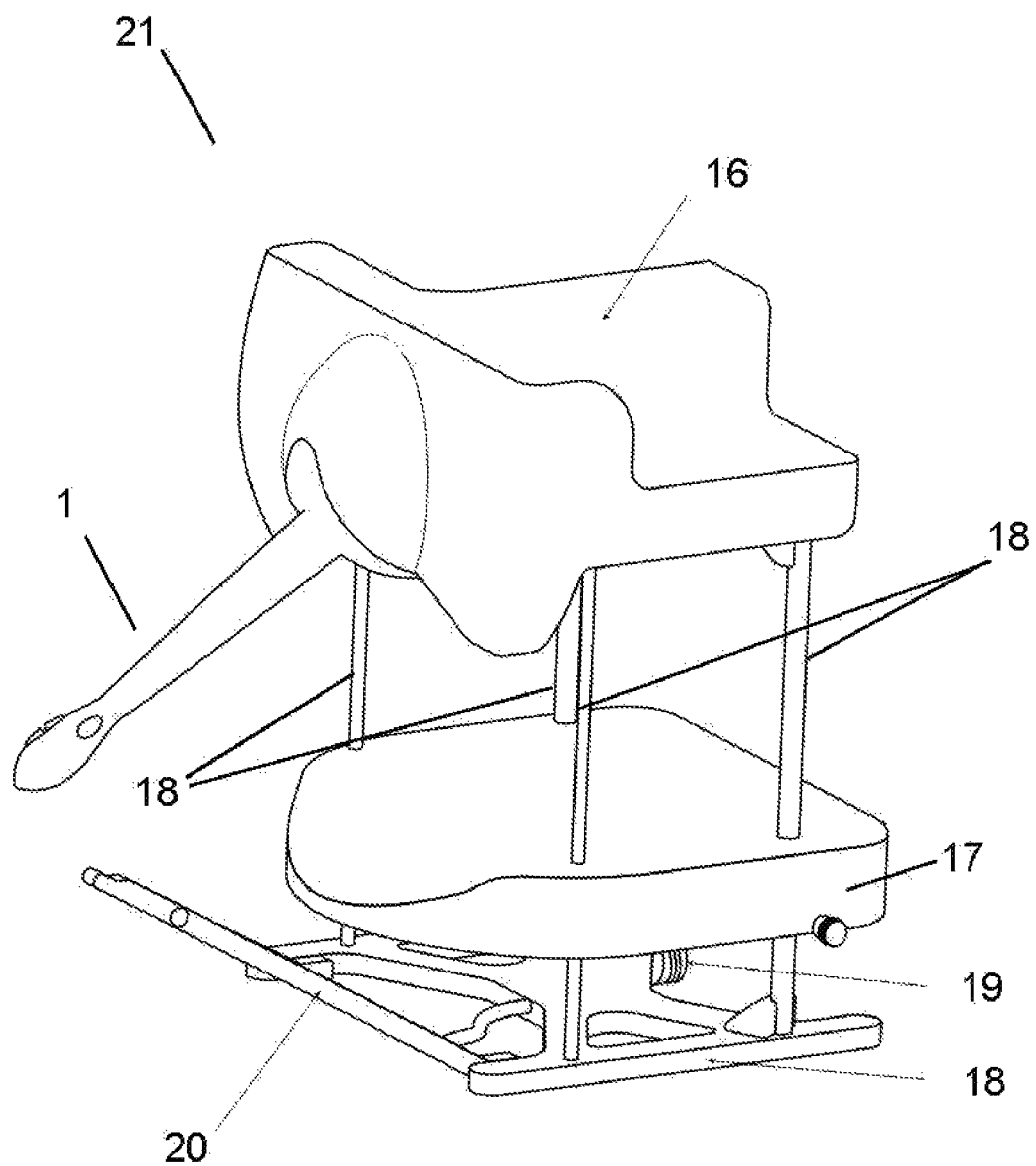
In FIG. 2, we can observe the control device wherein the haptic augmented reality device is integrated.

FIG. 2 shows the control device (21) wherein the haptic device shown in FIG. 1 is integrated, and comprising:
a casing (16), wherein is housed the actuation and control means (2) of the haptic device and wherefrom the boom model (1) emerges.
An armrest (17) positioned underneath the casing (16) and joined to it by means of vertical bars (18), leaving a free space wherethrough to pass and rest an arm whilst the hand holds the boom model (1).
A base (18) disposed underneath the armrest (17) and which is equipped with a position calibrator (20) and an automatic connector (19).

Having sufficiently described the nature of the present invention, as well as the manner of putting it into practice, it is stated that within is essential nature, it can be put into practice in other forms of embodiment that differ in details from those indicated by way of example, and whereto protection claimed will equally cover, provided that its main principle is not altered, changed or modified.

The invention claimed is:

1. Boom control device for in-flight refuelling operations by a boom, with touch control and reception, based on haptic augmented reality technology comprising:
   a boom model or prototype (1);
   controller and actuator (2) including a transmission arm (3) for actuation of the boom model (1);
the controller and actuator (2) comprising:
   a first double set of motors (4) to allow performance of a horizontal movement of the boom model (1);
   a second double set of motors (5) to allow a pitch movement and being rotatable with respect to an axis orthogonal to the axis of rotation of the first set of motors;
   a counterweight to balance the forces of both sets of motors; and
   first electronic controller (7) to actuate and control the motors (4) and (5);
the boom model (2) having a form similar to the actual boom that is intended to be handled and comprising:
   second electronic controller (8) to control the elements that form part of the boom model;
   a vibrator (9) housed inside the boom model (8);
   a series of buttons (10), (11) and (12);
   an acceleration sensor (13); and
   a magnet (14);
   LEDs (15); and
Whereby a single hand is used to control the boom.

2. Ergonomic and support unit of the control device of the boom for in-flight refuelling operations by a boom, with touch control and reception, based on haptic augmented reality technology, defined in claim 1, comprising:
   a casing (16) housing the controller and actuator (2) of the haptic device and wherefrom the boom model (1) emerges;
   an armrest (17) positioned underneath the casing (16) and joined to the casing (16) by vertical bars (18) definint a free space wherethrough to pass and rest an arm whilst the hand holds the boom model (1); and
   a base (18) disposed underneath the armrest (17) and equipped with a position calibrator (20) and an automatic connector (19).

3. Actuation and control system of an in-flight refuelling unit by a boom, integrating therein the control device of the boom, with touch control and reception, based on haptic augmented reality technology, defined in claim 1, comprising:
   An information subsystem comprising:
      Database with 3D models of all elements necessary in a refuelling operation; and
      Expert system including information on the operation;
   A Perception subsystem comprising:
      a redundant system for visually capturing information relating to the operation;
      a sensor system for capturing information from the environment of interest for the operation;
   An Analysis subsystem for creating a 3D model of the operation stage in real time;
   A smart refuelling system, wherein from the result of the analysis performed by the analysis subsystem, and using the information of the expert system in refuelling operations, the smart refuelling system determines and updates in real time:
      recommended sequence of movements to be executed to successfully perform the information;
      set of movements to prevent;
      set of movements to hinder;
   A subsystem comprising the control device of the boom, with touch control and reception, based on haptic augmented reality technology, defined in claim 1;
   A feedback subsystem for producing in the haptic remote control subsystem actions reflecting both the effect of the environment and the regulatory and recommended strategies for performing the operation.

4. The system according to claim 3, wherein the the redundant system combines several types of visual information including:
   Image capturing with structured lighting: a sequence of images captured with a set of cameras at a predetermined rate of frames per second;
   Image capturing with cameras with time of flight (ToF) sensors; and
   Information from cameras from the standard instrumentation of reloading aircraft to allow the connection of the cameras found as standard in the aircrafts, suitable for the initial phase of the reloading operation, when the aircraft to be refuelled is more than 15 metres away to provide additional redundancy to the system.

5. The system according to claim 4, comprising:
   Boom-haptic subsystem feedback including a set of sensors in the actual boom to capture the forces that the actual boom is subjected to and turns the forces into actions on the control motors of the haptic subsystem; and
   Smart refuelling system-haptic subsystem feedback for determining in real time the set of movements to favour and hinder and to what degree and translates the set into a series of actions on the control motors of the haptic subsystem.

* * * * *